United States Patent
Alam et al.

(10) Patent No.: US 9,741,331 B1
(45) Date of Patent: Aug. 22, 2017

(54) SOUND-ATTENUATING COMPOSITE STRUCTURE

(71) Applicant: The Boeing Company, Chicago, IL (US)

(72) Inventors: Shahriar Alam, Chandler, AZ (US); Eric Herrera, Mukilteo, WA (US); Carlos Portugal, Mesa, AZ (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 15/170,622

(22) Filed: Jun. 1, 2016

(51) Int. Cl.
| | |
|---|---|
| *G10K 11/168* | (2006.01) |
| *B32B 3/12* | (2006.01) |
| *B32B 3/26* | (2006.01) |
| *B32B 7/12* | (2006.01) |
| *F02C 7/045* | (2006.01) |

(52) U.S. Cl.
CPC .............. *G10K 11/168* (2013.01); *B32B 3/12* (2013.01); *B32B 3/266* (2013.01); *B32B 7/12* (2013.01); *F02C 7/045* (2013.01); *B32B 2250/03* (2013.01); *B32B 2266/04* (2013.01); *B32B 2307/102* (2013.01); *B32B 2605/18* (2013.01)

(58) Field of Classification Search
CPC .. B32B 3/12; B32B 3/266; B32B 7/12; B32B 2250/03; B32B 2266/04; B32B 2307/102; B32B 2605/18
USPC ......................................... 181/292, 290, 214
See application file for complete search history.

(56) References Cited

U.S. PATENT DOCUMENTS

| | | | |
|---|---|---|---|
| 4,716,067 A | 12/1987 | Moji et al. | |
| 5,776,579 A * | 7/1998 | Jessup | B32B 3/12 |
| | | | 181/288 |
| 6,220,388 B1 * | 4/2001 | Sanborn | E04B 1/86 |
| | | | 181/290 |
| 6,716,782 B2 | 4/2004 | Heng et al. | |
| 7,419,031 B2 | 9/2008 | Liguore et al. | |
| 7,540,354 B2 | 6/2009 | Morin et al. | |
| 8,162,035 B2 | 4/2012 | Behrens et al. | |
| 8,256,569 B1 | 9/2012 | Huff | |
| 8,413,761 B2 * | 4/2013 | Ayle | G10K 11/172 |
| | | | 181/292 |

(Continued)

OTHER PUBLICATIONS

"HexWeb Honeycomb attributes and Properties" A comprehensive guide to standard Hexcel honeycomb materials, configuration, and mechanical properties.

*Primary Examiner* — Forrest M Phillips
(74) *Attorney, Agent, or Firm* — Miller, Matthias & Hull LLP

(57) ABSTRACT

A sound-attenuating composite structure may comprise a honeycomb core assembly having a plurality of honeycomb cells defined by sidewalls, wherein the honeycomb core assembly is sandwiched between an inner impervious skin and a perforated outer skin. The sound-attenuating composite structure may further comprise a ceramic foam insert received in each of the honeycomb cells at a predetermined insertion depth to form an obstruction therein. Each of the ceramic foam inserts may have a predetermined thickness defined between substantially flat top and bottom surfaces. The sound-attenuating composite structure may have predetermined acoustic performance characteristic that are controlled, at least in part, by the predetermined thickness and the predetermined insertion depth.

18 Claims, 4 Drawing Sheets

(56) References Cited

U.S. PATENT DOCUMENTS

| | | | | |
|---|---|---|---|---|
| 8,651,233 | B2* | 2/2014 | Ayle | G10K 11/172 |
| | | | | 181/292 |
| 8,733,500 | B1* | 5/2014 | Ayle | G10K 11/172 |
| | | | | 181/284 |
| 8,800,714 | B2 | 8/2014 | Ichihashi | |
| 9,334,059 | B1* | 5/2016 | Jones | B64D 33/02 |
| 9,469,985 | B1* | 10/2016 | Ichihashi | G10K 11/172 |
| 2009/0173571 | A1* | 7/2009 | Keller | B64C 1/066 |
| | | | | 181/292 |
| 2011/0131945 | A1 | 6/2011 | Vauchel et al. | |
| 2011/0133025 | A1 | 6/2011 | Vauchel et al. | |
| 2011/0254196 | A1 | 10/2011 | Vauchel et al. | |
| 2012/0177877 | A1* | 7/2012 | Lebail | B29C 44/1228 |
| | | | | 428/116 |
| 2014/0367512 | A1* | 12/2014 | Dean | B64C 1/40 |
| | | | | 244/1 N |
| 2015/0027629 | A1 | 1/2015 | Butler et al. | |
| 2016/0264231 | A1* | 9/2016 | Stache | B64C 1/40 |

* cited by examiner

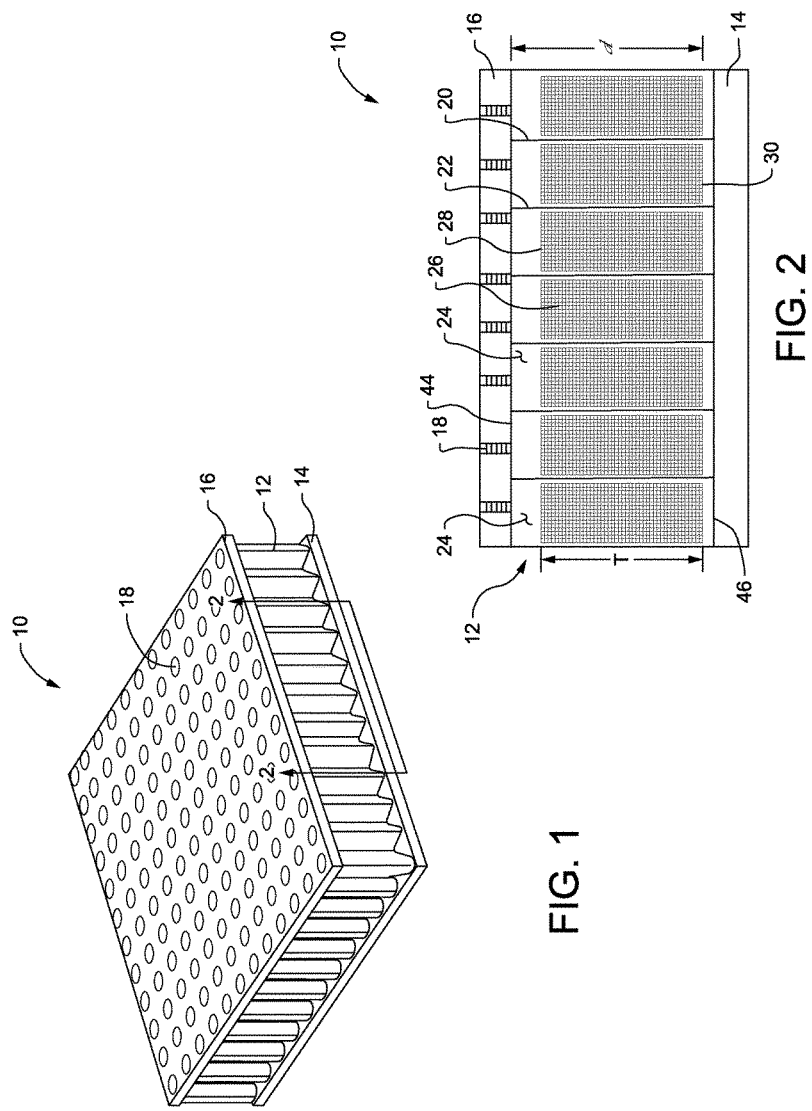

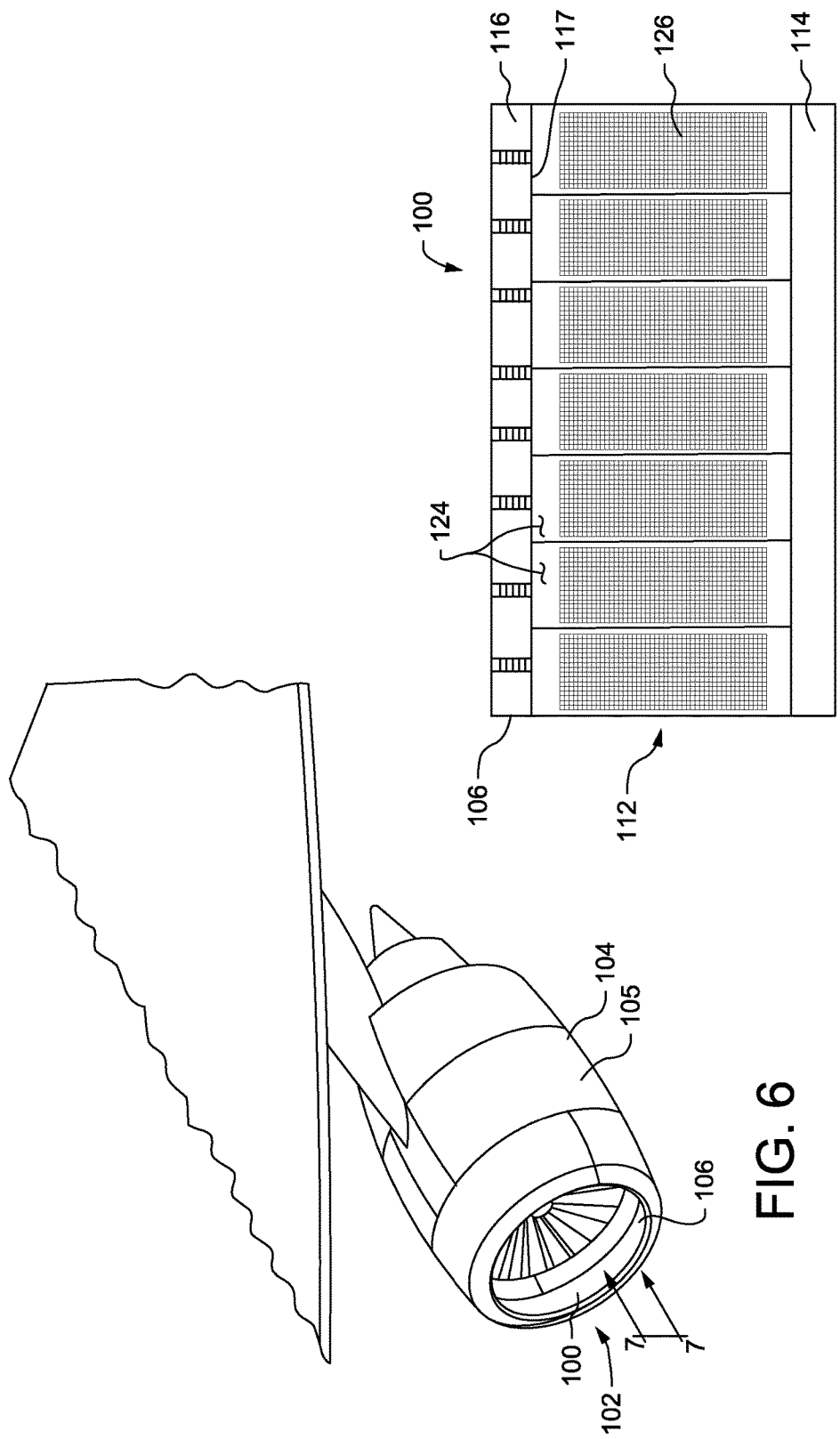

US 9,741,331 B1

SOUND-ATTENUATING COMPOSITE STRUCTURE

FIELD

The present disclosure generally relates to composite structures capable of attenuating noise over a wide range of frequencies and, more specifically, to composite structures having a honeycomb core with ceramic foam inserts received in the cells of the honeycomb core.

BACKGROUND

Current sound-attenuating structures may include a honeycomb core and thin, woven septa positioned in the cells of the honeycomb core that attenuate noise coming from a noise-generating source, such as an aircraft engine. While effective, such woven septa may be relatively expensive and complex to implement, and may only effectively attenuate noise at certain frequencies.

SUMMARY

In accordance with one aspect of the present disclosure, a sound-attenuating composite structure is disclosed. The sound-attenuating composite structure may comprise a honeycomb core assembly having a plurality of honeycomb cells defined by sidewalls, and the honeycomb core assembly may be sandwiched between an impervious inner skin and a perforated outer skin. The composite structure may further comprise a ceramic foam insert received in each of the honeycomb cells at a predetermined insertion depth to form an obstruction therein. Each of the ceramic foam inserts may have a predetermined thickness defined between substantially flat top and bottom surfaces. The sound-attenuating composite structure may have predetermined acoustic performance characteristics controlled, at least in part, by the predetermined thickness and the predetermined insertion depth.

In accordance with another aspect of the present disclosure, a noise-abatement apparatus for an aircraft engine inlet is disclosed. The noise-abatement apparatus may comprise an aircraft engine inlet barrel having a perforated outer skin, and a honeycomb core assembly attached to an interior side of the perforated outer skin. The honeycomb core assembly may have a plurality of honeycomb cells defined by sidewalls. In addition, the noise-abatement apparatus may further comprise a plurality of substantially planar ceramic foam inserts each positioned at a predetermined insertion depth in a respective one of each of the honeycomb cells, and each of the ceramic foam inserts may have a predetermined thickness defined between substantially flat top and bottom surfaces. The noise-abatement apparatus may have predetermined acoustic performance characteristics controlled, at least in part, by the predetermined thickness and the predetermined insertion depth.

In accordance with another aspect of the present disclosure, a broadband acoustic attenuation structure is disclosed. The broadband acoustic attenuation structure may include a honeycomb core having a plurality of honeycomb cells defined by sidewalls. The structure may be fabricated by a method comprising applying an adhesive to the sidewalls of the honeycomb cells, placing the honeycomb core on a ceramic foam block having a predetermined thickness, and applying pressure to the press the honeycomb core through the ceramic foam block so that the sidewalls of the honeycomb core slice the ceramic foam block into a plurality of ceramic foam inserts that are each positioned inside of a respective one of each of the honeycomb cells at a predetermined insertion depth. The method may further comprise allowing the adhesive to dry to adhesively bond the ceramic foam inserts to the sidewalls of the honeycomb cells.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 1 is a perspective view of a sound-attenuating composite structure including a honeycomb core assembly and inner and outer skins, constructed in accordance with the present disclosure.

FIG. 2 is a cross-sectional view through the section 2-2 of FIG. 1, depicting ceramic foam inserts positioned at a predetermined depth in cells of the honeycomb core, constructed in accordance with the present disclosure.

FIG. 6 is a perspective view of an aircraft engine inlet having a noise-abatement apparatus, constructed in accordance with the present disclosure.

FIG. 7 is a cross-sectional view through the section 7-7 of FIG. 6, constructed in accordance with the present disclosure.

DETAILED DESCRIPTION

Figure 4:
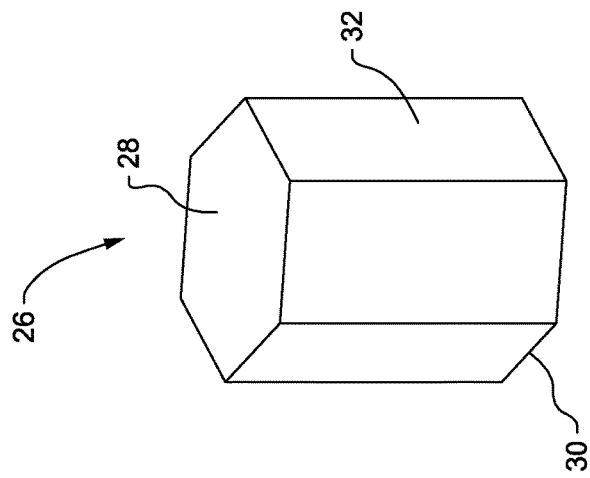
FIG. 4 is a side perspective view of a ceramic foam insert of the honeycomb core assembly shown in isolation, constructed in accordance with the present disclosure.

Referring now to the drawings, and with specific reference to FIGS. 1-2, a sound-attenuating composite structure 10 is shown. The structure 10 may be employed for noise abatement in a range of applications including, but not limited to, aircraft, spacecraft, automotive, construction, and appliance applications. As illustrated, the composite structure 10 includes a honeycomb core assembly 12 sandwiched between an impervious inner skin 14 and a perforated outer skin 16 having a plurality of perforations 18. The outer skin 16 faces the noise-generating source (the flow side) to allow sound waves to pass through the perforations 18 into the core assembly 12 for attenuation. However, in some arrangements, both of the inner and the outer skins 14 and 16 may be either perforated or impervious. Alternatively, the structure 10 may have only one skin or may lack skins entirely.

Figure 3:
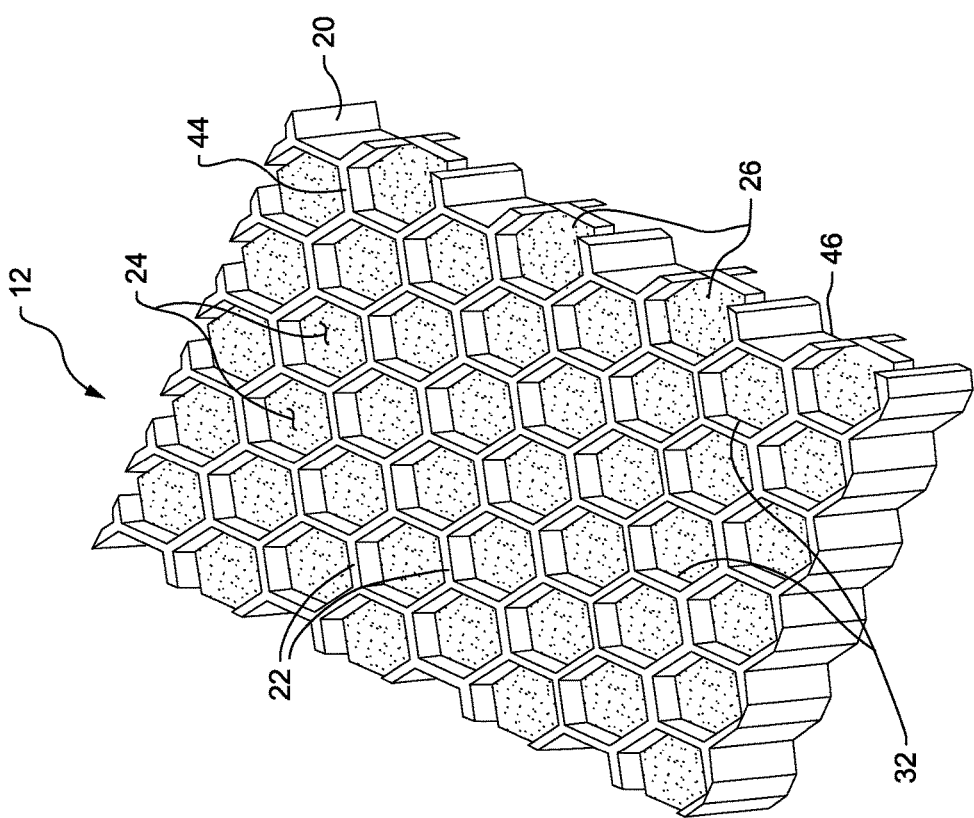
FIG. 3 is a top perspective view of the honeycomb core assembly with the inner and outer skins removed, constructed in accordance with the present disclosure.

Turning to FIGS. 2-3, the honeycomb core assembly 12 includes a honeycomb core 20 having sidewalls 22 defining a plurality of honeycomb cells 24. One or more ceramic foam inserts 26 are separately received within an interior of each of the honeycomb cells 24 to form an obstruction in each of the cells 24 (also see FIG. 2). In alternative arrangements, only some of the cells 24 may have ceramic foam inserts 26 received therein. In the illustrated embodiment, each of the ceramic foam inserts 26 has a predetermined thickness (T) defined between substantially flat top and bottom surfaces 28 and 30, wherein the thickness (T) of each insert 26 is substantially thicker than current thin, woven septa of the prior art. Moreover, the pores of the ceramic foam inserts 26 are substantially uniform in size and are uniformly distributed throughout the ceramic foam insert 26. By virtue of their thickness and structural uniformity, the ceramic foam inserts 26 act as bulk absorbers that absorb or otherwise attenuate noise over a wide range of frequencies. In this regard, the composite structure 10 attenuates broadband acoustic energy. As used herein, 'broadband acoustic attenuation' refers to the ability to attenuate noise over a wide range of frequencies as quantified by a non-linear factor (NLF) value of less than 1.7. As will be understood by those of ordinary skill in the art, an NLF value of 1 means that the structure is capable of equally attenuating noise over all frequencies. In particular, the volumetric dimensions of the ceramic foam inserts 26 are sized to resonate, reflectback, and destructively interfere with incident broadband acoustic energy.

In addition to the predetermined thickness (T), the ceramic foam inserts 26 have a predetermined insertion depth (d) in the honeycomb cells 24. The predetermined thicknesses (T) and insertion depths (d) may be the same for all of the ceramic foam inserts 26 in the assembly 12, or the ceramic foam inserts 26 may have varying thicknesses and insertion depths. Notably, the composite structure 10 has predetermined acoustic performance characteristics (e.g., NLF values and acoustic impedance/Rayl values) that are controlled, at least in part, by the predetermined thickness (T) and insertion depth (d) of the ceramic foam inserts 26. In other words, the acoustic performance characteristics of the composite structure 10 may be strategically tuned according to the needs of the application at hand by varying the thicknesses and insertion depths of the ceramic foam inserts 26. Other parameters that may be adjusted to tune the acoustic performance characteristics of the structure 10 include the porosity (e.g., pore size and distribution) and the structural homogeneity of the ceramic foam inserts 26.

In some embodiments, each of the ceramic foam inserts 26 has a shape and size that is complementary to the shape and size of the honeycomb cell 24 in which it is received, such that the ceramic foam inserts 26 fill a part of the volume of the cells 24 and contact the sidewalls 22 to create an obstruction that divides each cell into different volumes. In addition, an adhesive may be used to adhesively bond the outer edges 32 of the ceramic foam inserts 26 to the sidewalls 22 of the cells 24 (also see FIG. 4). For example, if the honeycomb cells 24 have a hexagonal prism shape as shown in FIG. 3, the ceramic foam inserts 26 will have a hexagonal prism shape as well (also see FIG. 4). However, in alternative core designs, the cells 24 of the honeycomb core 20 may have other shapes (e.g., corrugated, square, etc.), in which case the ceramic foam inserts 26 will be shaped and sized accordingly. Furthermore, the ceramic foam inserts 26 may be substantially planar due to the substantially flat top and bottom surfaces 28 and 30.

The inserts 26 consist of a rigid, insulating ceramic foam material. For instance, in some embodiments, the inserts 26 are formed from Boeing Rigid Insulation™ (BRI) as described in U.S. Pat. No. 8,162,035 and U.S. Pat. No. 6,716,782. BRI is composed of a combination of silica fibers, alumina fibers, and boron carbide powder that aids in fusing the silica and alumina fibers together during sintering. More specifically, the BRI material of the ceramic foam inserts 26 may consist of about 60 weight (wt) % to about 80 wt % silica fibers, about 19.9 wt % to about 40 wt % alumina fibers, and about 0.1 wt % to about 1.0 wt % boron carbide powder. The BRI material may have a pore size of about 35 micrometers (μm), and a porosity of between about 90% to about 96%, although the pore sizes and porosity may vary depending on the precise composition and preparation procedure. When formed from BRI, the ceramic foam inserts 26 may maintain structural integrity at extreme temperatures of up to about 2000° Fahrenheit (F) or more. Accordingly, depending on the temperature capability of the honeycomb core 20 and the skins 14 and 16 (which may or may not be able to withstand 2000° F.), the composite structure 10 may be compatible with high temperature areas, such as an exhaust area of an aircraft engine.

The honeycomb core 20 may be formed from a range of different metallic, nonmetallic, and composite materials depending on the application such as, but not limited to, aluminum (or an aluminum alloy), carbon, polyurethane, as well as fiber-reinforced composite materials such as fiberglass-reinforced honeycombs and aramid fiber-reinforced honeycombs (e.g., Nomex®, Kevlar®, KOREX®). Moreover, the honeycomb core 20 may have a range of cell sizes and material densities. As one non-limiting possibility, the honeycomb core 20 is a fiberglass reinforced phenolic resin honeycomb having a density of 3.5 pounds per cubic foot (lb/ft$^3$) and a ⅜ inch cell size. Likewise, the composition, porosity, and dimensions of the skins 14 and 16 may vary considerably depending on the application. As a non-limiting possibility, the inner and outer skins 14 and 16 are composed of a graphite epoxy composite material.

Figure 5:
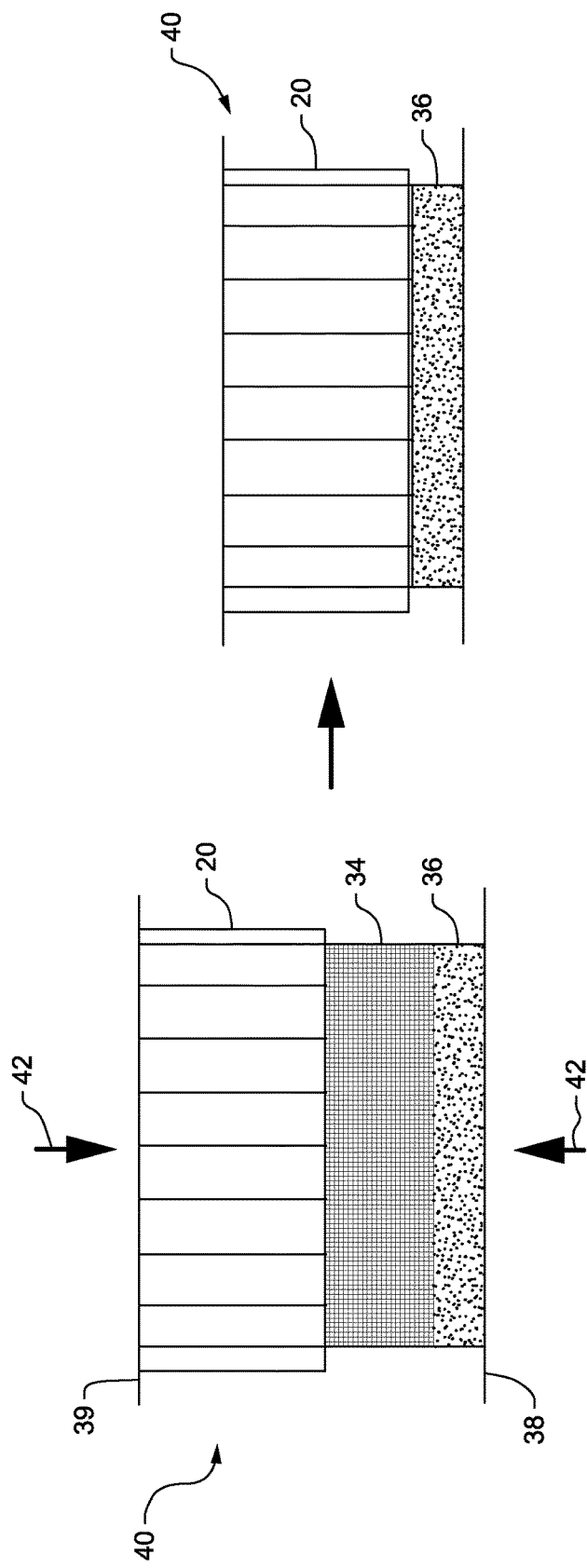
FIG. 5 is a schematic representation of a method of fabricating the honeycomb core assembly using a ceramic foam block, in accordance with a method of the present disclosure.

Referring now to FIG. 5, a method of fabricating the honeycomb core assembly 12 of the composite structure 10 is schematically depicted. A ceramic foam block 34 (e.g., a BRI foam block) having the predetermined thickness (T) is sawed from a larger piece of ceramic foam, and placed on top of a foam 36 or another shock-absorbing material that is placed on a bottom pressure plate 38 of a press machine 40. The honeycomb core 20 having an adhesive applied to the sidewalls 22 of the cells 24 is then placed on top of the ceramic foam block 34 beneath a top pressure plate 39. Pressure 42 is applied to the pressure plates 38 and 39 to press the honeycomb core 20 through the ceramic foam block 34. As a result, the sidewalls 22 slice the ceramic foam block 34 into a plurality of ceramic foam inserts 26 each positioned inside a respective one of the cells 24. Thus, in this embodiment, the core 20 itself serves as a template that dictates the dimensions of the ceramic foam inserts 26 necessary to fill the cells 24. Continued application of pressure 42 with the assistance of a measuring device (e.g., a ruler) is used to push the ceramic foam inserts 26 to the predetermined depth (d). It is noted that the ceramic foam inserts 26 may not be flush with either an upper surface 44 or a lower surface 46 of the core 20 (see FIGS. 2-3) to prevent the inserts 26 from interfering with the bonding of the skins 14 and 16 to the honeycomb core 20. For example, the ceramic foam inserts 26 may be placed at least about ⅛ of an inch to about ½ of an inch from either the upper or lower surfaces 44 and 46 of the honeycomb core 20, depending on the application.

Once the inserts 26 are pushed into the core 20 to the predetermined depth (d), the adhesive applied to the sidewalls may be permitted to dry to adhesively bond the outer edges 32 of the inserts 26 to the sidewalls 22 (also see FIG. 2). The inner and outer skins 14 and 16 are then bonded to the lower and upper surfaces 44 and 46 of the core 20, respectively, using methods apparent to those with ordinary skill in the art.

FIGS. 6-7 illustrate one possible application of the composite structure 10 as a noise-abatement apparatus 100 for an inlet 102 of an aircraft engine 104 housed in a nacelle 105. The noise-abatement apparatus 100 may be constructed like the composite structure 10 described above, wherein like numerals represent like components or features. In particular, the noise-abatement apparatus 100 includes an engine inlet barrel 106 having a perforated outer skin 116 facing the airflow (or the interior side of the nacelle 105) to permit sound waves to travel into a honeycomb core assembly 112 attached to an interior side 117 of the perforated outer skin 116 that faces the internal space within the nacelle 105. Furthermore, as with the composite structure 10 described above, the honeycomb core assembly 112 is sandwiched between the outer skin 116 and an impervious inner skin 114, and has honeycomb cells 124 with ceramic foam inserts 126 of predetermined thicknesses (T) positioned at predetermined insertion depths (d) therein to provide sound-attenuation over a wide range of frequencies. As explained above, the predetermined thicknesses (T) and insertion depths (d) (as well as the porosity and homogeneity of the inserts) may be strategically chosen to tune the acoustic performance characteristics (e.g., NLF, acoustic impedance/Rayl, etc.) of the apparatus 100 as needed.

It will be understood that FIGS. 6-7 depict but one possible application of the composite structure 10 disclosed herein, as the structure may be adapted to provide a noise-abatement structure at other locations of an aircraft, such as the thrust reverser or the passenger cabin, or even at higher temperature regions such as the exhaust area. Similarly, it may adapted as a noise-abatement or sound-proofing structure for various other applications such as construction (e.g., walls), automotive (e.g., mufflers), or household appliance applications (e.g., dishwashers, washer/dryers, blenders, vacuum cleaners, etc.), among many other possibilities.

INDUSTRIAL APPLICABILITY

Unlike woven septa (e.g., woven polyether ether ketone (PEEK) septa) of the prior art which are relatively thin (on the order of mils) and only effectively attenuate noise at certain frequencies, the ceramic foam inserts disclosed herein are nonwoven and are not limited in thickness by thread diameters. Accordingly, the ceramic foam inserts may be made relatively thick (on the order of fractions of an inch or more). The thickness and structural uniformity/homogeneity of the ceramic foam inserts disclosed herein allow the inserts to function as bulk absorbers that effectively attenuate noise uniformly over a wide range of frequencies. Thus, the composite structure disclosed herein may exhibit broadband attenuation, characterized by an NLF value of less than 1.7. An NLF value approaching 1, indicating near ideal uniform noise attenuation over all frequencies, may be achieved by suitably adjusting the thickness, the insertion depth, and/or the porosity/homogeneity of the ceramic foam inserts in the honeycomb core. Such broadband attenuation may be particularly advantageous for use with applications generating noise at varying frequencies, such as aircraft applications where different noise frequencies are generated during take-off, cruise, turning, and landing.

Furthermore, the BRI foam inserts disclosed herein are structurally robust and stable at extremely high temperatures (up to about 2000° F.), making them far better suited for high temperature applications than the PEEK woven septa of the prior art which generally degrade at temperatures above about 700° F. The woven septa of the prior art may also be relatively expensive, and complex to implement and precisely locate at defined positions in the honeycomb cells. In contrast, the ceramic foam inserts disclosed herein may be fabricated by pushing a ceramic foam block into the honeycomb cells with relative ease using the honeycomb sidewalls to slice the inserts to the required cell dimensions.

Thus, it can be seen that the technology disclosed herein may find applicability in many industries that may benefit from sound-attenuating components such as, but not limited to, aerospace, automotive, construction, and household appliance industries. Furthermore, the technology disclosed herein may find applicability in any such industry requiring noise-abatement in high temperature regions.

This specification describes several exemplary embodiments of a sound-attenuating composite structure and methods of forming such a structure. Features and aspects of the different embodiments can be combined with or substituted for one another.

What is claimed is:

1. A sound-attenuating composite structure, comprising:
    a honeycomb core assembly having a plurality of honeycomb cells defined by sidewalls, the honeycomb core assembly being sandwiched between an impervious inner skin and a perforated outer skin; and
    a ceramic foam insert received in each of the honeycomb cells at a predetermined insertion depth to form an obstruction therein, each of the ceramic foam inserts having a predetermined thickness defined between substantially flat top and bottom surfaces, the sound-attenuating composite structure having predetermined acoustic performance characteristics controlled, at least in part, by the predetermined thickness and the predetermined insertion depth, the ceramic foam insert consisting of silica fibers, alumina fibers, and boron carbide powder.

2. The sound-attenuating composite structure of claim 1, wherein the ceramic foam insert is stable at temperatures of up to about 2000° Fahrenheit.

3. The sound-attenuating composite structure of claim 2, wherein the ceramic foam insert includes a plurality of pores, and wherein the pores are substantially uniform in size and are uniformly distributed throughout the ceramic foam insert.

4. The sound-attenuating composite structure of claim 2, wherein the ceramic foam insert consists of:
    about 60 weight % to about 80 weight % silica fibers;
    about 19.9 weight % to about 40 weight % alumina fibers; and
    about 0.1 weight % to about 1.0 weight % boron carbide powder.

5. The sound-attenuating composite structure of claim 4, wherein the honeycomb core assembly attenuates broadband acoustic energy, and wherein the volumetric dimensions of the ceramic foam inserts are sized to resonate, reflect-back, and destructively interfere with incident broadband acoustic energy.

6. The sound-attenuating composite structure of claim 4, wherein the ceramic foam insert is adhesively bonded to the sidewalls of the honeycomb cell in which the ceramic foam insert is received.

7. The sound-attenuating composite structure of claim 6, wherein the ceramic foam insert is shaped conformally with the honeycomb cell in which the ceramic foam insert is received.

8. The sound-attenuating composite structure of claim 7, wherein the ceramic foam insert has a hexagonal prism shape.

9. A noise-abatement apparatus for an aircraft engine inlet, comprising:
    an aircraft engine inlet barrel having a perforated outer skin;

a honeycomb core assembly attached to an interior side of the perforated outer skin and having a plurality of honeycomb cells defined by sidewalls; and a plurality of substantially planar ceramic foam inserts each positioned at a predetermined insertion depth in a respective one of each of the honeycomb cells, each of the ceramic foam inserts having a predetermined thickness defined between substantially flat top and bottom surfaces, the noise-abatement apparatus having predetermined acoustic performance characteristics controlled, at least in part, by the predetermined thickness and the predetermined insertion depth, the ceramic foam inserts consisting of silica fibers, alumina fibers, and boron carbide powder.

10. The noise-abatement apparatus of claim 9, wherein the ceramic foam inserts consist of:

about 60 weight % to about 80 weight % silica fibers;

about 19.9 weight % to about 40 weight % alumina fibers; and about 0.1 weight % to about 1.0 weight % boron carbide powder.

11. The noise-abatement apparatus of claim 10, wherein the ceramic foam inserts are stable at temperatures of up to about 2000° Fahrenheit.

12. The noise-abatement apparatus of claim 11, wherein each of the ceramic foam inserts has a plurality of pores, and wherein the pores are substantially uniform in size and are uniformly distributed throughout the ceramic foam insert.

13. The noise-abatement apparatus of claim 12, wherein the honeycomb core assembly has a non-linear factor (NLF) value of less than 1.7.

14. The noise-abatement apparatus of claim 12, wherein the ceramic foam inserts are adhesively bonded to the sidewalls of the honeycomb cells.

15. The noise-abatement apparatus of claim 14, wherein the honeycomb cells have a hexagonal cross-sectional shape.

16. The noise-abatement apparatus of claim 15, wherein the ceramic foam inserts are shaped conformally with the honeycomb cells.

17. A broadband acoustic attenuation structure, the broadband acoustic attenuation structure including a honeycomb core having a plurality of honeycomb cells defined by sidewalls, the structure being fabricated by a method comprising:

applying an adhesive to the sidewalls of the honeycomb cells;

placing the honeycomb core on a ceramic foam block having a predetermined thickness;

applying pressure to press the honeycomb core through the ceramic foam block so that the sidewalls of the honeycomb core slice the ceramic foam block into a plurality of ceramic foam inserts that are each positioned inside of a respective one of each of the honeycomb cells at a predetermined insertion depth; and allowing the adhesive to dry to adhesively bond the ceramic foam inserts to the sidewalls of the honeycomb cells.

18. The broadband acoustic attenuation structure of claim 17, wherein the ceramic foam block includes one or more of silica fibers, alumina fibers, and boron carbide powder.

\* \* \* \* \*